April 9, 1935.  T. GIBBONS  1,997,414

AUTOMATIC RIDE CONTROL FOR MOTOR DRIVEN VEHICLES

Original Filed Oct. 31, 1932

INVENTOR
T. Gibbons
by: E. J. Fetherstonhaugh
ATTORNEY

Patented Apr. 9, 1935

1,997,414

UNITED STATES PATENT OFFICE 1,997,414

AUTOMATIC RIDE CONTROL FOR MOTOR DRIVEN VEHICLES

Thomas Gibbons, Walkerville, Ontario, Canada

Application October 31, 1932, Serial No. 640,494
Renewed October 1, 1934

10 Claims. (Cl. 188—87)

The invention relates to automatic ride control for motor driven vehicles, as described in the present specification and illustrated in the accompanying drawing that forms part of the same.

The invention consists essentially in causing the adjustment member of a shock absorber to synchronize with the different speeds of a shaft operatively connected thereto, as pointed out in the claims for novelty following a description in detail of the preferable construction for effecting this synchronism by electrical means.

The objects of the invention are to insure easy riding in a motor car or other vehicle over rough or comparatively uneven roads or pavements and to do this without affecting to any material extent the comfortable resiliency of the springs under smooth road conditions, which is perhaps the most vital point in the support of car bodies, for the very good reason that a manual adjustment of the customary shock absorber does not correct the resilient supports, for the differing conditions rapidly following one another, as for example, the apertures in the absorbers may be narrowed so greatly as to leave at places a comparatively rigid support when a yielding support is suitable, and similarly a readily yielding support may follow the adjustment and be in evidence on reaching a very considerable bump, consequently nothing will eliminate the bouncing effects of the jolts unless the shock absorbers are adjusted at each change in speed in a selective shaft or in two selective shafts, as the case may be; to produce economically a device that will take care of all shock absorbers within reach of electrical wiring connections and particularly to facilitate the negotiation of a rough road at low speed and yet govern the supporting properties of the shock absorbers, notwithstanding the slow pace of the car, and generally to provide without any material draft on the power resources of the vehicle, an efficient and serviceable means for automatically adjusting the shock absorbers.

Like numerals of reference indicate corresponding parts in the various figures.

Figure 1:
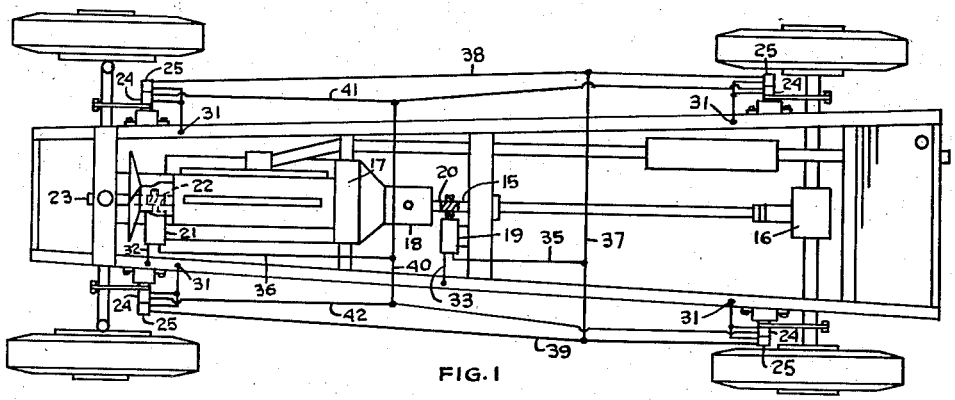
Figure 1 is a plan view of the chassis of the motor car showing diagrammatically the shock absorbers, the generators and the electrical connections.

Referring to the drawing, the numeral 15 indicates the driven or drive shaft, as it is usually called, which is part of the connection from the crown gear and pinion 16 to the prime mover 17, these connections including the usual gearset 18 or other transmission members.

The electric generator 19 is operated from the drive shaft 15 by the gear mechanism 20, and is always coincident with the rotation of the shaft following the variations of speed precisely.

Another generator 21 is connected by a gear mechanism 22 to the prime mover shaft 23 and the operation of this generator is precisely the same in relation to its shaft as the generator 19 in relation to its shaft, both shaft and armature operating together in each instance, though it may occur in some constructions that the armatures will operate at a different R. P. M. than their respective shafts, but they will still agree positively with the variations of speed, therefore the electric current delivered will vary accordingly as the speeds of the shafts vary and this constitutes the principle of operation in this invention.

The solenoids 24 and 25 with the common core 26 engage the spring 27 encircling the pin 28 from said core and this spring engages the adjusting member 29 of the shock absorbers 30, these shock absorbers are distributed throughout the vehicle wherever they are wanted for cushioning purposes and in Figure 1 of the drawing four are shown, which is the customary number in the usual passenger motor car.

Each of the shock absorbers are shown as grounded at 31 to the motor car frame, while the grounding of the generators is indicated at 32 and 33.

The transmission wire 35 from the generator 19 extends to a connection 37, and this connection extends to a wire 38 on the one side and 39 on the other side, these wires 38 and 39 forming the passage for the electric current to the several shock absorbers and more particularly to the solenoids 25 of each shock absorber.

The generator 21 is similarly connected to the solenoids 24 through the transmission wire 36, the connection wire 40 and side wires 41 and 42 and this completes the transmission of the current incidental to the several solenoids.

Figure 2:
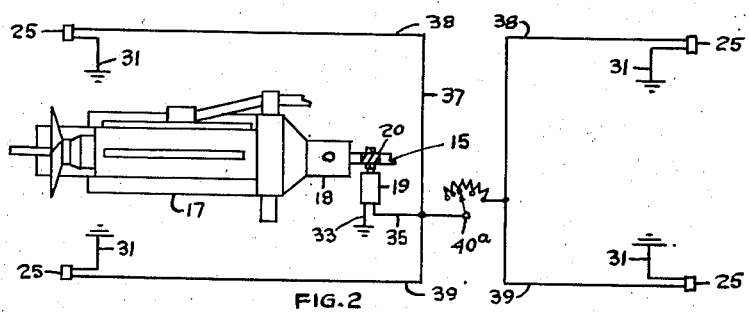
Figure 2 is a diagrammatic view showing the wiring plan from the generator driven by the drive shaft.
Figure 3:
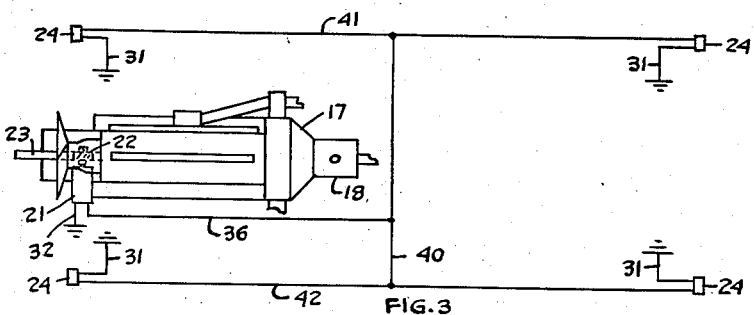
Figure 3 is a similar wiring diagram showing the wiring plan from the generator driven by the engine shaft.

In Figure 2 a rheostat or variable resistance is added more as an addition than anything else to make the invention more complete and is indicated by the numeral 40ª. This resistance is introduced for the purpose of establishing a minimum and maximum power according to the load carried by the vehicle, as for example some cars very appreciably feel the extra passenger or two and similarly trucks and delivery wagons show an increase in the weight of the goods, consequently the stiffness of the shock absorbers must be increased proportionately with the extra weight. Therefore the minimum power must be increased and in some cases eventually reach the maximum thereby making it possible to operate the adjusting devices under all conditions.

Briefly the operation of the invention is as follows:—

While the car is running in high gear, the running shaft 15 to all intents and purposes extends through to the crown gear and pinion, therefore the engine shaft and the drive shaft operate at the same speed.

Under these circumstances, the resistance to pressure on the seats of the motor car must be at the maximum when the normal high speed has been reached, and under such conditions the generator 19 and the generator 21 are both delivering current to the solenoids with the result that the core is drawn in the direction of the adjusting device, which as has been mentioned may be of any type according to the shock absorber used, it is merely a matter of making the operative connections as to what mechanical movements will take place on drawing the core from the coils of the solenoids. This core being common to two solenoids, the spring is pressed inwardly or drawn outwardly according to the construction of the shock absorber, but in the illustration, the core is shown as drawn in the direction of a conventional valve, so that the spring exerts continuously greater pressure on the valve which increases the resistance to weight pressure on the seats of the valves.

Now, in the natural order of things, there will be considerable variations of speed in the shafts extending through the vehicle and forming the single shaft operation throughout the vehicle, and these variations of speed will naturally be the same in so far as the engine shaft and drive shaft are concerned, therefore there will just simply be a diminution of current supplied to the solenoids as the quantity delivered will naturally drop with the slowing up of the armature shafts, but when the load is increased and the speed of the car materially reduced, then it is desirable to keep up a good resistance to weight pressure on the seats, because the increase of load means that the car is travelling over a comparatively rough road, such as a detour which frequently occurs in motoring.

The engine shaft will now be travelling at a considerable speed and the power transmitted through the change gear mechanism, therefore the drive shaft may revolve quite slowly in comparison to the engine shaft, but the engine shaft will maintain through its speed, a good and regular delivery of electric current from the generator 21 to the several solenoids and this will combat the additional weight on the seats due to bumps in travelling slowly over a rough road and thereby maintain the efficiency of the cushioning effect of the shock absorbers.

It is obvious that either one or other of the generators may be used, though for a complete equipment, it is much better to use both, but the car will operate in so far as its shock absorbers are concerned very well with simply the drive shaft generator or with simply the engine shaft generator, though where one only is used, the drive shaft will most likely be the one selected.

The flexible nature of this equipment is what must be emphasized in so far as the invention is concerned, because the actual cost of the generators amounts to very little, and their connection to the shafts is an every day affair, while the wiring plan and the solenoid operations are so well known in electrical practice as to need no comment.

Figures 4, 5:
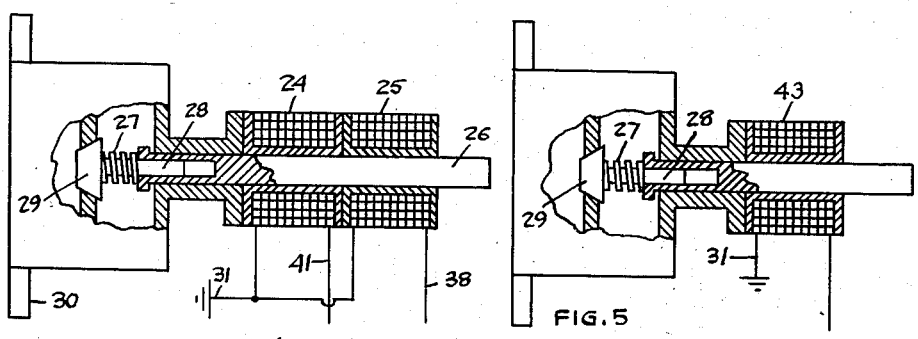
Figure 4 is a diagrammatic view showing an enlarged detail of a conventional valve with double solenoids applied thereto for automatic spring pressure adjusting.
Figure 5 is a detail of a conventional valve showing a single solenoid as the spring pressure adjustment.

In Figure 5, a single solenoid is used at each shock absorber and this is indicated by the numeral 43, otherwise the construction and parts are just the same as with the addition of the second solenoid, and have the same indicating numerals.

What I claim is:—

1. In an automatic ride control for motor driven vehicles, an adjusting mechanism for vehicle shock absorbers, a rotating member and electrical means operating said adjustable mechanism, and synchronizing in its operations with the variations in speed of said rotating member.

2. In an automatic ride control for motor driven vehicles, a plurality of shock absorbers having adjusting devices for regulating their resisting properties, electrical means for operating said adjusting devices, a shaft periodically rotating at different speeds and suitably driven, an electrical machine operatively connected to said shaft and transmission lines delivering power from said machine to said electrical means in quantities varying correspondingly with the changing speed of the shaft.

3. In an automatic ride control for motor driven vehicles, a plurality of shock absorbers having adjusting devices, a motor shaft periodically rotating at different speeds, an electrical machine operatively connected to said shaft and transmission lines delivering power from said machine to said electrical means in quantities varying correspondingly with the changing speed of the shaft.

4. In an automatic ride control for motor driven vehicles, a plurality of shock absorbers having adjusting devices, a drive shaft periodically rotating at different speeds and suitably driven an electrical machine operatively connected to said shaft and transmission lines delivering power from said machine to said electrical means in quantities varying correspondingly with the changing speed of the shaft.

5. In an automatic ride control for motor driven vehicles, a plurality of shock absorbers having adjusting devices, a motor shaft and a drive shaft periodically rotating at different speeds, electrical machines operatively connected at said shafts and transmission lines delivering power from said machines to said electrical means in quantities varying correspondingly with the changing speed of the shafts.

6. In an automatic ride control for motor driven vehicles, a plurality of shock absorbers having adjusting devices for regulating their resisting properties, electrical means for operating said adjusting devices, a shaft periodically rotating at different speeds and suitably driven, an electric generator operatively connected to said shaft and transmission lines delivering power from said generator to said electrical means in quantities varying correspondingly with the changing speed of the shaft.

7. In an automatic ride control for motor driven vehicles, a plurality of shock absorbers having adjusting devices for regulating their resisting properties, solenoids for operating said adjusting devices, a shaft periodically rotating at different speeds and suitably driven, an electrical machine operatively connected to said shaft and transmission lines delivering power from said generator to said electrical means in quantities varying correspondingly with the changing speed of the shaft.

8. In an automatic ride control for motor driven vehicles, a plurality of shock absorbers having adjusting valves for regulating their resisting properties, electrical means for operating said adjusting valves, a shaft periodically rotating at different speeds and suitably driven, an electrical machine operatively connected to said shaft and transmission lines delivering power from said machine to said electrical means in quantities varying correspondingly with the changing speed of the shaft.

9. In an automatic ride control for motor driven vehicles, a plurality of shock absorbers having adjusting devices for regulating their resisting properties, front and rear electrical means for operating said adjusting devices, a shaft periodically rotating at different speeds and suitably driven, an electrical machine operatively connected to said shaft, transmission lines delivering power from said machine to said electrical means in quantities varying correspondingly with the changing speed of the shaft and a variable resistance suitably operated and adapted to control the power to the rear electrical means.

10. In an automatic ride control for motor driven vehicles, a plurality of shock absorbers having adjusting devices for regulating their resisting properties, solenoids for operating said adjusting devices, a motor shaft and a drive shaft periodically rotating at different speeds, electric generators operatively connected to said shafts and transmission lines delivering power from said generators to said solenoids in quantities varying correspondingly with the changing speed of the shafts.

THOMAS GIBBONS.